United States Patent Office.

EDWARD JOSEPH DE SMEDT, OF NEW YORK, N. Y., ASSIGNOR TO NEW YORK IMPROVED ANTHRACITE COAL COMPANY, OF SAME PLACE.

Letters Patent No. 103,582, dated May 31, 1870.

IMPROVEMENT IN ASPHALT ROADS AND PAVEMENTS.

The Schedule referred to in these Letters Patent and making part of the same.

*To all whom it may concern:*

Be it known that I, EDWARD JOSEPH DE SMEDT, of the city, county and State of New York, have invented a new and useful Improvement in Asphalt Roads and Pavements; and I do hereby declare that the following is a full, clear, and exact description of the same.

This invention has for its object to overcome the difficulty attending the construction of asphalt roads and pavements as regards the proper laying of the asphalt and the rendering of the same competent to bear exposure in our climate, especially the high temperature of summer months.

Many asphalts are difficult to melt and spread evenly on a road-surface, and, to remedy this, I add a certain quantity of heavy petroleum oil, or the residuum of the same, which will not volatilize at an ordinary temperature, to the asphalt, and I also add a quantity of the substances known as Ritchie mineral and Albertite, either or both, (powdered,) the latter in a short time absorbing the excess of the petroleum oil, and causing the asphalt to harden shortly after being laid.

The manner of preparing, treating, and laying the asphalt mass is as follows:

I take asphalt, one hundred and twenty-five parts; petroleum oil, twenty-five parts. These substances are melted and thoroughly incorporated together, and to this mixture I add, in a heated state, sand or powdered stone, seven hundred and fifty parts; and gravel or broken stone, also heated, eleven hundred parts. The whole is then thoroughly mixed, and from five to fifty parts of Ritchie mineral, or Albertite, in a powdered state, is added to the mass. The Ritchie mineral, or Albertite, is simply mixed with the mass, time not being allowed for it to dissolve, the mass being immediately applied to the road-surface after the Ritchie mineral is added, and the latter soon absorbs the excess of petroleum oil, and the mass rapidly hardens, and is rendered capable of withstanding the heat of our summer months.

I wish it to be distinctly understood that by the term asphalt I mean the natural substance so called by chemists and geologists, and not any of the products of the distillation of bituminous coal, which, of late years, have been popularly, but incorrectly, thus termed.

Having thus described my invention,

What I claim as new, and desire to secure by Letters Patent, is—

The combination of asphalt, petroleum oil, or the residuum of the same, and Ritchie mineral, or Albertite, either or both, with suitable proportions of sand, gravel, and broken stone, or equivalent substances, treated, in the manner and for the purpose substantially as herein set forth.

E. J. DE SMEDT.

Witnesses:
WM. F. MCNAMARA,
A. R. HAIGHT.